(No Model.)
C. P. STEINMETZ.
ALTERNATING CURRENT SYSTEM OF DISTRIBUTION.
No. 559,913. Patented May 12, 1896.
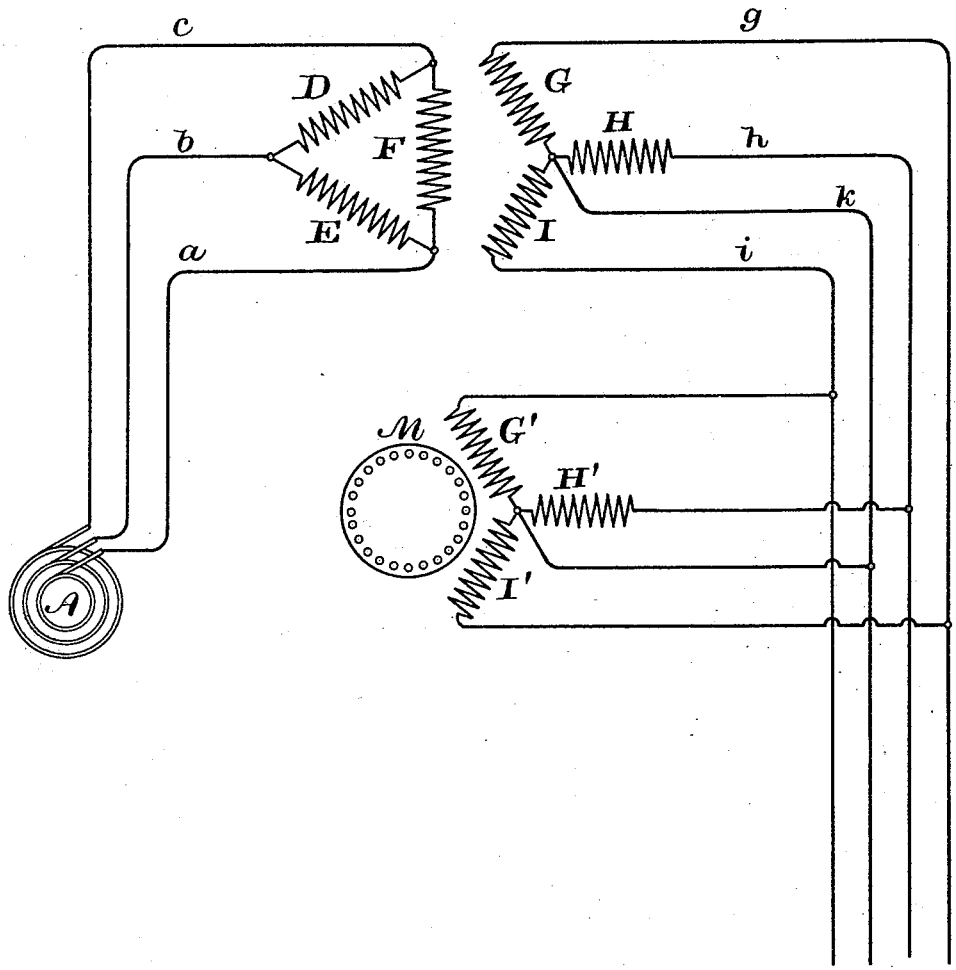
WITNESSES.
A. H. Abell.
A. F. Macdonald.
INVENTOR.
Charles P. Steinmetz, by
Geo. B. Blodgett,
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ALTERNATING-CURRENT SYSTEM OF DISTRIBUTION.

SPECIFICATION forming part of Letters Patent No. 559,913, dated May 12, 1896.

Application filed February 5, 1896. Serial No. 578,152. (No model.)

*To all whom it may concern:*

Be it known that I, CHARLES P. STEINMETZ, a subject of the Emperor of Germany, residing at Schenectady, in the county of Schenectady, State of New York, have invented certain new and useful Improvements in Alternating-Current Systems of Distribution, (Case No. 332,) of which the following is a specification.

My invention relates to the distribution of alternating currents, particularly to polyphase distributions. It has its most important application to three-phase systems, but others are not excluded. It has for its object to provide a means of equalizing the voltages upon the several sides of the system, or of "balancing the lines," as it is often called.

It has been proposed to connect transformers wound for three-phase work with the Y system of connection and to run a neutral wire from the common junction of the coils back to the generator. Where the secondaries are also connected with the Y system, this neutral wire on the primary side is a necessity, because, although a neutral may also be run from the secondary side, this will not equalize the load, but with an unequal distribution of load the three secondary voltages will become unbalanced and greatly unequal. Nothing holds them at an equality, but on the contrary they change and adjust themselves so as to be proportioned to the three secondary currents. The neutralizing-wire on the primary side running from the generator to the transformer must necessarily be of sufficient cross-section to equalize the load, and still it is normally an idle wire. This is of course objectionable and deprives the three-phase system when so installed of one of its characteristic advantages—to wit, economy in copper cost. The generator also must be specially constructed where this is done, inasmuch as an additional sliding contact must be provided for the neutral wire.

To obviate the difficulties thus pointed out, I have devised my invention, which consists in winding the primaries of the transformers with delta connection and the secondaries with Y connection and using a neutral or equalizing wire on the secondary side of the system only, and I have found that by this arrangement so long as the primary voltages are constant the secondary potentials also are constant, irrespective of the balance of load upon the secondaries.

The accompanying drawing shows a diagrammatic embodiment of my invention, A being a generator of three-phase current, $a$, $b$, and $c$ being the mains therefrom.

D E F are the primary coils connected in delta; G H I, the secondary coils of the transformer.

$G'$ $H'$ $I'$ are the inducing-coils of the three-phase motor M.

$g$ $h$ $i$ are the leads connecting the secondary coils and the motor-coils together, and $k$ is the neutral or equalizing wire.

I thus not only obtain the advantage in transmission of current at long distance of confining the equalizing-wire to the secondary distribution only, but inasmuch as this may be connected to fixed terminals upon the motors I avoid the additional sliding contacts already referred to.

What I claim as new, and desire to secure by Letters Patent of the United States, is—

1. An alternating-current system of distribution, comprising transformers having their primaries connected in delta, and their secondaries in Y, and a neutral or equalizing wire extending from the common junction of the secondaries only.

2. A generator of three-phase currents, lines leading therefrom, a transformer having its primary connected in delta between the lines, a secondary for the transformer having the coils connected in Y, and an equalizing-wire extending from the common junction of the secondary coils.

In witness whereof I have hereunto set my hand this 3d day of February, 1896.

CHARLES P. STEINMETZ.

Witnesses:
 B. B. HULL,
 A. F. MACDONALD.